Aug. 13, 1935.  W. J. ALBERSHEIM ET AL  2,010,837
VISCOSITY MEASURING DEVICE
Filed April 28, 1926   2 Sheets-Sheet 1
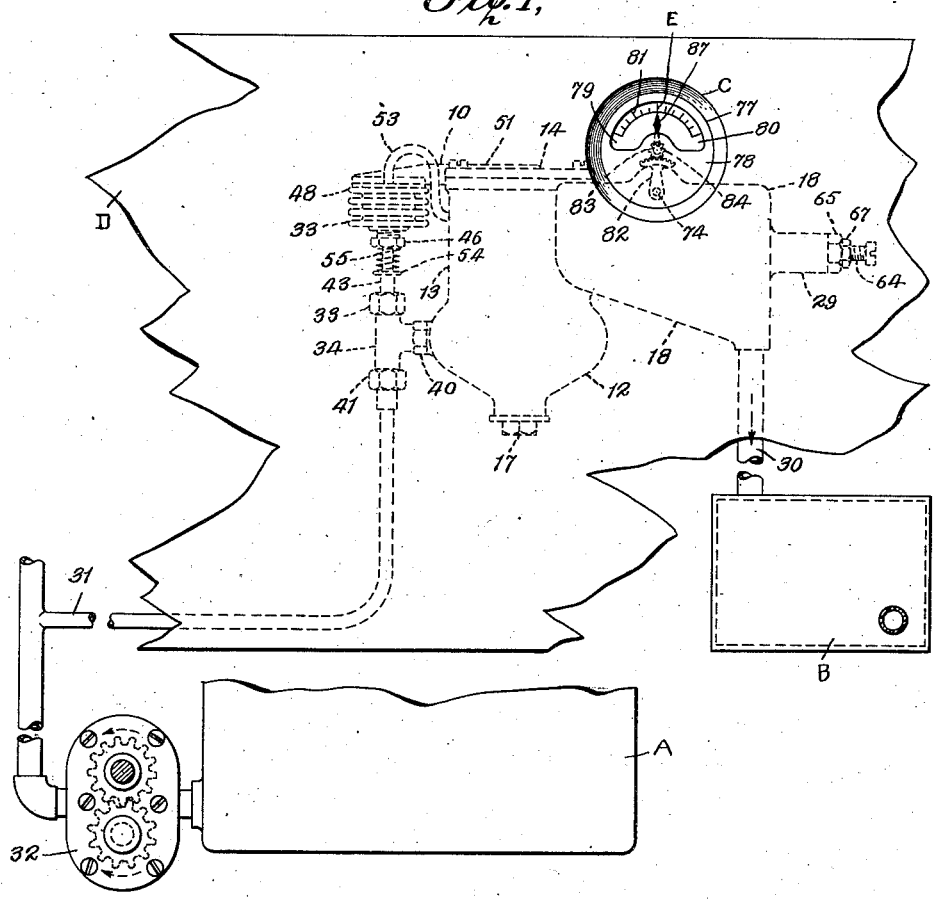
Fig.1,
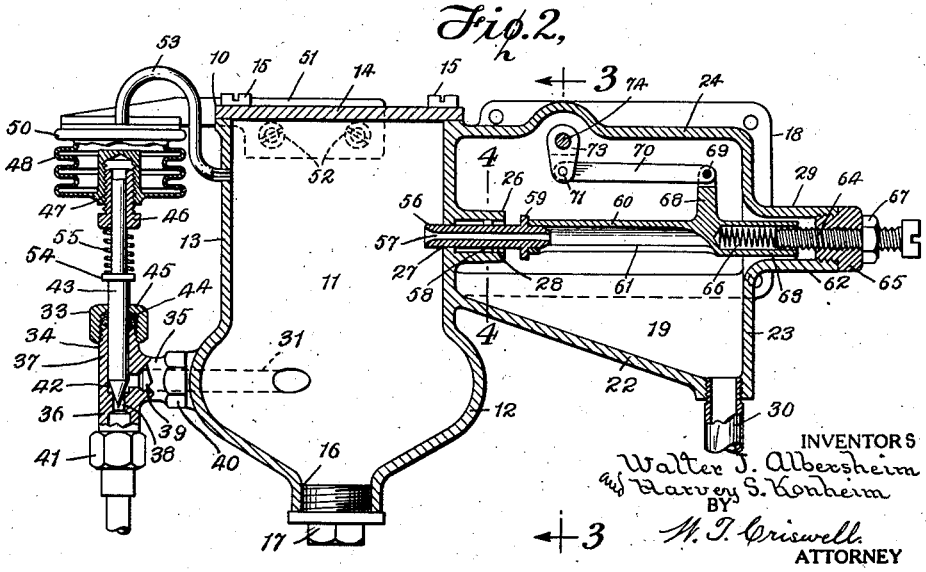
Fig.2,
INVENTORS
Walter J. Albersheim
Harvey S. Konheim
BY
M. T. Criswell
ATTORNEY

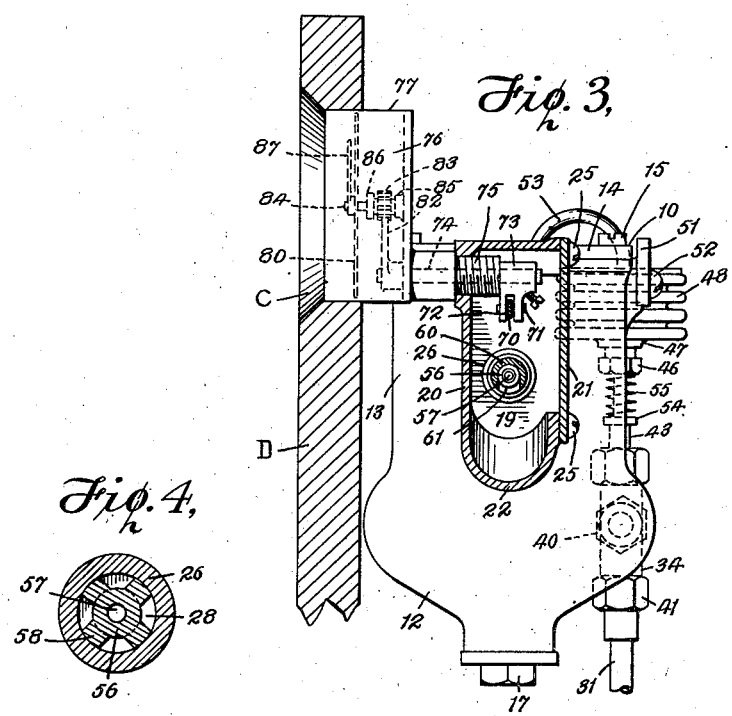

Patented Aug. 13, 1935

2,010,837

UNITED STATES PATENT OFFICE 2,010,837

VISCOSITY MEASURING DEVICE

Walter J. Albersheim and Harvey S. Konheim,
New York, N. Y.

Application April 28, 1926, Serial No. 105,188

6 Claims. (Cl. 265—11)

This invention relates more particularly to a class of testing apparatus.

Our invention has for its object primarily to provide a measuring device adapted to be employed for testing the viscous value of liquids, especially the lubricating oils used for motor driven vehicles, machines, engines and other apparatus, and which is of a form capable of permitting the per cent of viscous components or lubricating properties of the fluid to be computed during various periods of its delivery, in order to avoid using particularly lubricating oils of grades below the known standards of quality.

The invention contemplates the provision of means for conveying a fluid, such as lubricating oil, of unknown viscosity to a passage having a restricted area, and means is provided for causing the fluid to be delivered to the restricted passage at a determined pressure whether the fluid is of standard value of viscosity or of a viscosity below or above the standard grade. The means providing the restricted passage may be stationary or movable, and means including an indicating device are provided for being made effective by the pressure from the retardation of the fluid according to the density of its viscous components to flow through the restricted passage for operating the indicating device to indicate the variations of the speed of the fluid so that the units of its viscosity value may be approximated.

A further object of the invention is to provide a viscosity measuring device of a simple and efficient construction which may be made in appropriate sizes and shapes.

With these and other objects in view, the invention will be hereinafter more fully explained with reference to the accompanying drawings forming a part of this specification in which similar characters of reference indicate corresponding parts in all the views, and will then be pointed out in the claims at the end of the description.

In the drawings, Figure 1 is a fragmentary view, partly broken away and partly sectional, showing one form of our improved viscosity measuring device applied to a support such as the dash board of an automobile.

Fig. 2 is an enlarged fragmentary sectional view, partly in elevation, taken through the device proper.

Fig. 3 is an enlarged fragmentary sectional view, partly in elevation, taken on the line 3—3 of Fig. 2 and which shows the device applied to the dash board.

Fig. 4 is an enlarged sectional view taken on the line 4—4 of Fig. 2.

The device has a casing 10 providing a feed chamber 11 for receiving and conveying a liquid of indeterminate viscosity, such as lubricating oil, for being tested to approximate its viscous value during its delivery. The casing 10 may be of any suitable size and shape, though the wall of the casing illustrated has a bowl-shaped lower portion, as 12, with an upwardly protruding cylindrical neck portion, as 13. The mouth of the casing in the upper end of the neck portion is closed by a removable cover 14 which may be bolted, as at 15, to the wall of the neck portion. In the bottom of the lower portion 12 of the casing is a threaded outlet 16 which may be closed by a removable screw cap, as 17.

Extending laterally from part of the neck portion 13 of the casing 10 is an auxiliary casing 18 providing a discharge chamber 19. The auxiliary chamber 18 may be somewhat U-shaped in cross-section, as shown in Fig. 3, to provide side walls 20, 21 and a lower curved wall 22 which is disposed on a downward incline from the neck portion 13 of the casing 10. The lower wall 22 terminates at an end wall 23 which is opposite to the neck portion 13 of the casing 10, and the casing 18 has a top wall 24. The side wall 21 of the casing 18 is removable for allowing access into the discharge chamber 19, and this removable wall may be bolted, at 25, or otherwise fastened to the top wall 24 and to the lower wall 22. Protruding into the discharge chamber 19 from the neck portion 13 of the casing 10 is a tubular bearing member 26 having its passage 27 leading through the neck portion of the casing 10 into the feed chamber 11, and the part of the passage 27 of the tubular bearing which leads into the discharge chamber 19 is preferably enlarged, as at 28. On the end wall 23 of the auxiliary casing 18 is a tubular extension 29 which is so positioned that its passage is alined with the passage 27 of the tubular bearing 26, and at the juncture of the lower wall 22 with the end wall 23 of the auxiliary casing is an outlet or pipe 30.

Leading into the portion 12 of the wall of the casing 10 is an inlet or pipe 31 through which viscous fluid or lubricating oil of unknown viscosity is admitted into the feed chamber 11. The inlet pipe 31 may lead from any suitable source of fluid supply, such as a storage tank or the crank case, as A, of an automobile, autotruck or other vehicle or apparatus. Interposed in the inlet pipe 31 adjacent the crank case A is a pressure pump, as 32, which may be of any suitable type, such as the well known gear operative pump shown, for causing the fluid from the crank case to flow through the inlet pipe under pressure for delivery into the feed chamber 11. For example, the fluid may be delivered at a pressure of five pounds, and the flow of the fluid in the feed chamber is maintained at a uniform pressure by means of a regulator, as 33. The regulator 33 may be of any appropriate type, though the regulator illustrated is in the form of a valve having a casing 34 of somewhat a T-shape to provide an arm member 35 and two alined cross-arm members 36, 37. Through the alined arm members 36, 37 is a passage 38 and leading into this passage through the arm member 35 is another passage 39. The casing 34 is interposed in the inlet pipe 31 by connecting, at 40, the arm member 35 to part of the inlet pipe adjacent the casing 10 and by connecting, at 41, the cross-arm member 36 to another part of the pipe above the pump 32. The casing 34 is thereby disposed with its arm members 36, 37 in upright positions and with its arm member 35 extending longitudinally. In the lower part of the passage 38 at its juncture with the passage 39 is a valve seat 42, and by positioning the casing as shown the viscous fluid delivered under pressure in the inlet pipe from the pump 32 will flow into the lower part of passage 38, through the valve seat 42, and through the passage 39 into the lower portion of the feed chamber 11. Reciprocable in the upper part of the passage 38 of the casing 34 is a needle valve 43 having its pointed end movable upon and from the valve seat 42 to regulate the flow of fluid through the inlet pipe 31, and the valve 43 is of such a length that its upper portion extends through the upper part of the passage 38 to some distance above the casing 34. The upper end of the passage 38 surrounding the valve 43 may be made oil-tight by means of a packing 44 and an apertured cap, as 45, which is screwed on the upper threaded end of the casing 34. The upper end portion of the needle valve 43 is slidably movable in an exteriorly threaded bushing 46 which is adjustably screwed in the threaded socket of the hub or core member 47 of a well known form of bellows, as 48, having the usual accordion corrugated wall for expansibly and contractibly operating according to the variations of air pressure received therein. On the upper end of the wall of the bellows 48 is a cap 50 which is supported on one end of a bracket or bar, as 51, having its other end fastened, as at 52, to the upper end of the neck portion 13 of the wall of the casing 10 so that the bellows is positioned in spaced relation to the upper end of this casing. Leading from the upper part of the feed chamber 11 through the neck portion 13 of the wall of the casing 10 is a duct or pipe, as 53, which leads into the bellows 48 through its cap 50 for passage of compressed air from the feed chamber 11 into the bellows. On the central part of the valve 43 in spaced relation to the bushing 46 is an extending annular flange or stop collar 54, and encircling the part of the needle valve between this stop collar and the bushing 46 is a spiral spring 55 which has a thrust so that when compressed it will cause the pointed end of the needle valve 43 to yieldingly move upon its seat 42 for closing the passage of the inlet pipe 31, and the spring 55 is also tensioned to yield sufficiently for allowing the fluid when flowing through the inlet pipe 31 under a determined pressure, as at five pounds or at a greater pressure, to yieldingly raise the valve 43 from its seat. Thus when the viscous fluid is pumped under a pressure of five pounds the valve will be raised from its seat to allow its flow into the feed chamber 11 until the level of the fluid is somewhat above the passage 27 of the tubular bearing 26 of the casing 10. Should the fluid be delivered into the feed chamber at a greater pressure than five pounds the fluid will rise in the feed chamber a cause excess of compression of the air in the upper part of the feed chamber, and the compressed air will pass through the duct 53 into the bellows 48. The bellows will accordingly expand for moving its hub 47 and the bushing 46 to move downwardly, and the spring 55 will by its thrust cause the needle valve 43 to move upon its seat 42 in the casing 34 to shut-off the flow of the fluid in the inlet pipe 31, or the valve 43 will be moved sufficiently close to its seat for checking the flow of the fluid so that the operation of the pump 32 will be controlled for delivering the fluid through the inlet pipe under the determined pressure into the feed chamber. When the pressure of the air in the feed chamber 11 and in the bellows 48 is lowered to five pounds or less the bellows 48 will contractibly operate for allowing the needle valve 43 to reciprocally move according to the tension of the spring 55 to maintain a uniform pressure of the delivery of the fluid in the feed chamber 11 irrespective of the per cent of viscosity components of the fluid.

Serving as means to enable the viscous value of the fluid to be approximated to a reasonable degree of certainty, in the tubular bearing 26 of the casing 10 is a slidable tube 56 which is preferably of such a length that one of its ends extends somewhat into the feed chamber 11 and so that its other end protrudes beyond the end of the tubular bearing 26 into the discharge chamber 19. The passage 57 of the tube 56 is of an area so restricted that if the fluid in the feed chamber 11 is below a standard viscous value it will by reason of its fluidity flow accordingly through the restricted passage without appreciable resistance, but if the fluid is of a standard grade or above the recognized standard of value it will by reason of its viscosity flow with proportionate resistance through the restricted passage, and the tube 56 will then move accordingly in the passage 27 of the bearing 26. In order to permit the restricted passage member or tube 56 to freely move in its bearing 26, on the central part of this restricted passage member are provided a number of spaced radially protruding anti-friction bearing points or lugs, as 58, which movably engage the wall of the enlarged portion 28 of the passage 27 of the tubular bearing 26. The other portion of the passage 27 of the tubular bearing is of a diameter to allow the restricted passage member to also move freely therein, and the limited quantity of the fluid which may trickle through the passage 27 around the restricted passage member 56 will flow into the discharge chamber 19. Spaced from the end of the restricted passage member 56 may be an extending stop collar or annular flange 59, and on the adjacent free end part of the restricted passage member is held one end of a tubular operating stem or bar, as 60, which abuts against the stop collar 59. The restricted passage 57 of the member 56 leads into the passage of the tubular bar 60, and in the underside of this tubular bar is a slot 61 for allowing the viscous fluid which flows through the restricted passage member 56 to flow into the tubular bar for being discharged into the chamber 19. The passage 57 is configured to act as a pure friction tube, which means that the resistance offered by the tube to the flow of the liquid is composed of substantially only the product of viscosity times velocity. This resistance is distinguished from the dynamic resistance created by flow of the liquid through an orifice in which case the pressure drop is a function of the square of the velocity of the flowing liquid. From the chamber 19 the fluid will flow through the outlet pipe 30 into a receiving tank or chamber, as B. The second end of the operating bar 60 terminates with a member 62 having a socket, as 63, extending inwardly from its end, and this socket member is movably disposed in the passage of the tubular extension 29 of the end wall 23 of the discharge chamber 19. The socket member 62 terminates about midway of the extension 29 for allowing the restricted passage member 56, tubular bar 60 and the socket member 62 to move back and forth in the tubular bearing 26, discharge chamber 19 and the tubular extension 29. The free end part of the socket member 62 of the operating bar 60 is movable on one end of an adjusting screw or bolt, as 64 which is threaded through the bore of bushing 65, and this bushing is screwed in the free end of the tubular extension 29 of the discharge chamber 19. The screw bolt 64 is of a length so that its second end protrudes beyond the bushing 65 for permitting the screw bolt to be suitably adjusted in the socket 63 of the member 62 of the operating tubular bar 60. In the socket 63 of the member 62 between the bottom of this socket and the opposing end of the screw bolt is a compression spring 66. The spring 66 serves to yieldingly force the socket member 62 and the tubular operating bar 60 toward the tubular bearing 26 for yieldingly holding the restricted passage member 56 in a direction inwardly of the feed chamber 11, as shown in Fig. 2. By adjusting the screw bolt 64 in the bushing 65 the spring 66 may be tensioned to conform with the determined pressure in the feed chamber for allowing the restricted passage member 56 to be moved in the bearing 26 inwardly of the discharge chamber 19 against the tension of the spring by the resistance of the fluid in the feed chamber to flow through the restricted passage 57 when the fluid is of a standard viscosity or of a higher grade of viscous value. When the screw bolt 64 is properly adjusted in the bushing 65 it is releasably locked by means of a nut 67 which is threaded on the bolt and is rotated into engagement with the bushing 65. Projecting in the discharge chamber 19 upwardly from the part of the operating tubular bar 60 adjacent the socket member 62 is an arm, as 68, having a bifurcated upper end, and in this bifurcated end is pivoted, at 69, one end of a bar 70 having its other end pivoted, at 71, to the pronged projection, as 72, of an eccentric sleeve, as 73. The eccentric 73 is held on one end of a stud 74 which is journaled in an exteriorly threaded bearing, as 75, which is screwed through a threaded opening in the upper part of the wall 20 of the discharge chamber 19. The stud 74 is of such a length that its second end is rotatively disposed through an opening in the rear wall of the casing, as 76, of an indicating device 77 for indicating the approximate viscous value of the fluid being tested. The front 78 of the casing 76 of the indicating device is provided with a window or opening, as 79, in its upper part, and when the apparatus is employed on an automobile or like vehicle the casing 76 may be mounted in a suitable opening, as C, provided in the dash board D of the vehicle. In the casing 76 in spaced relation to its front 78 is a fixed dial plate 80 having on its front face a scale, as 81, which is positioned for being observed through the window 79 of the casing. On the end of the stud 74 protruding into the casing 76 of the indicating device 77 is a segmental gear, as 82, in mesh with a pinion 83 held upon a short shaft 84 having one of its ends journaled in a bearing 85 provided on the rear wall of the casing 76, and the central part of the shaft 84 is rotative in the aperture of a fixed bar, as 86, which extends across the interior of the casing. The second end part of the shaft 84 is rotatably disposed through an orifice in the dial plate 80, and on the end of the shaft 84 in front of the dial plate is held one end of a pointer 87 for being swung across the scale 81 of the dial plate to indicate on the scale the variations of the viscosity of the fluid being tested.

When the apparatus is operated for testing a fluid of unknown viscosity the spring 66 is tensioned by adjusting the screw bolt 64, as above explained, for positioning the tubular bar 60, and restricted passage member 56 and to also position the bar 70, eccentric 73, stud 74, segmental gear 82, pinion 83 and shaft 84 so that the pointer 87 will be in register with one of the symbols or markings, as E, on the scale 81 which may be recognized as indicating the known standard of viscous value of the class of fluid. These operative parts of the apparatus may be further adjusted so that the pointer 81 is normally spaced slightly from the standard marking E. Should the per cent of viscous components be less than the standard grade, the liquid by reason of its fluidity will flow through the restricted passage member 56 without sufficient retardation to move the restricted passage member, and the liquid will pass into the tubular bar 60 and through the slot 61 into the discharge chamber 19. If the fluid is of a quality approaching the standard value of viscosity or is of a standard grade or contains a higher per cent of viscous components than that of the standard grade, the viscosity of the fluid will cause retardation of its flow through the restricted passage member 56, and the restricted passage member will be moved in the bearing 26 toward the discharge chamber 19 by the pressure of the fluid according to its resistance in the restricted passage member. The movement of the restricted passage member will likewise move the bar 60 and the socket member 62 against the tension of the spring 66, and the arm 68 of the bar 60 will be moved in a similar direction. The bar 70 will then move to swing the eccentric 73 for rotating the stud 74 to swing the segmental gear 82 of the indicating device 77 for rotating the pinion 83, and the shaft 84 will be rotated to swing the pointer 87 to the marking E of the scale 81, or to one of the other markings such as the markings to the left of the marking E, which may be established for indicating that the fluid is of standard grade or of a higher quality of viscous value. When the flow of the fluid through the apparatus has stopped the tension of the spring 66 will cause reverse action of the parts to move the restricted passage member 56 back to its normal position in the bearing 26.

In the foregoing description, we have embodied the preferred form of our invention, but we do not wish to be understood as limiting ourselves thereto as we are aware that modifications may be made therein without departing from the principle or sacrificing any of the advantages of this invention, therefore, we reserve to ourselves the right to make such changes as fairly fall within the scope thereof.

Having thus described our invention, we claim as new and desire to secure by Letters Patent:—

1. A viscosity measuring device comprising in combination, a chamber, means connected to said chamber to conduct thereto under pressure liquid of undetermined viscosity, a valve mounted in said last mentioned means and adapted to control the flow of liquid to said chamber, a bellows device mounted exteriorly of said chamber and including means connecting the interior of said bellows with said chamber, whereby said bellows is expanded or contracted in accordance with variations in pressure in said chamber and means connected to said bellows and to said valve to operate the valve for controlling the flow of liquid to the chamber, a friction tube movably mounted in one wall of said chamber, elastic means to retard the movement of said tube, the said tube being so positioned that the passage of liquid therethrough out of said chamber imparts a movement to said tube, a dial, and a link mechanism connected between said tube and said dial whereby the movement of said tube is indicated.

2. A viscosity measuring device comprising in combination, a chamber, means connected to said chamber to conduct thereto under pressure liquid of undetermined viscosity, a valve mounted in said last mentioned means and adapted to control the flow of liquid to said chamber, a bellows device mounted exteriorly of said chamber including means connecting the interior of said bellows with said chamber, whereby said bellows is expanded or contracted in accordance with variations in pressure in said chamber and means connected to said bellows and to said valve to operate the valve for controlling the flow of liquid to the chamber, a friction tube slidably mounted in one wall of said chamber, and adapted to be traversed by the liquid flowing out of said chamber, means to resist the sliding of the tube, and means associated with said tube and movable thereby to indicate the speed of flow of liquid therethrough.

3. A viscosity measuring device comprising in combination, a first chamber, means to conduct to said first chamber a liquid of undetermined viscosity under pressure, a valve mounted in said last mentioned means, yieldable means connected to said first chamber and responsive to variations in pressure in said first chamber to control said valve, a second chamber, both said chambers having a common wall, a friction tube movably mounted in said wall, said tube connecting said first chamber with said second chamber and adapted to be traversed by the passage of liquid from said first chamber to said second chamber, the passage of said liquid through said tube imparting thereto a linear movement, means to oppose the movement of the tube and means responsive to said movement to indicate the viscosity.

4. A viscosity measuring device comprising in combination, a first chamber, means to conduct to said first chamber liquid of undetermined viscosity under pressure, a valve mounted in said last mentioned means, yieldable means connected to said first chamber and responsive to variations in pressure in said first chamber to control said valve, a second chamber, both said chambers having a common wall, a friction tube movably mounted in said wall, said tube connecting said first chamber with said second chamber and adapted to be traversed by the passage of liquid from said first chamber to said second chamber, the passage of said liquid through said tube imparting thereto a linear movement, yieldable means to oppose the movement of said tube, and means responsive to said movement to indicate the viscosity.

5. A viscosity measuring device comprising in combination, a chamber having an inlet for the liquid to be tested, a valve mounted in said inlet for controlling the flow of liquid therethrough, yieldable means to operate said valve, said means being connected to said chamber, a tube slidably mounted in one wall of said chamber, said tube having a restricted passage which offers frictional resistance to the flow of liquid therethrough, said flow of liquid through its resistance causing the tube to move in one direction, yieldable means connected to said tube and acting in a direction to oppose the movement of said tube, means connected to said tube and movable thereby to indicate viscosity.

6. A viscosity measuring device for liquids comprising in combination, a chamber having an inlet for the liquid to be tested, a valve to control the flow of liquid into said chamber, a tube slidably mounted in one wall of said chamber, said tube having a restricted passage which offers frictional resistance to the flow of liquid therethrough, said flow of liquid through its resistance causing the tube to move in one direction, a bellows device connected to said chamber and being responsive to the pressure of the liquid therein to operate said valve, yieldable means connected to said tube and acting in a direction to oppose the movement of said tube, and means connected to said tube and movable thereby to indicate viscosity.

WALTER J. ALBERSHEIM.
HARVEY S. KONHEIM.